(12) United States Patent
Awoniyi et al.

(10) Patent No.: US 8,737,994 B2
(45) Date of Patent: May 27, 2014

(54) DISCONTINUOUS TRANSMISSION IN FEMTOCELLS

(75) Inventors: Olufunmilola O. Awoniyi, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 12/940,382

(22) Filed: Nov. 5, 2010

(65) Prior Publication Data

US 2012/0115471 A1    May 10, 2012

(51) Int. Cl.
*H04W 4/00*    (2009.01)

(52) U.S. Cl.
USPC ........ 455/435.1; 455/574; 455/450; 370/311; 370/338

(58) Field of Classification Search
USPC ........... 455/435.1, 428, 448, 13.4, 41.1–41.2, 455/515, 522–525, 574, 127.5; 370/310.2, 370/328, 337, 338, 346, 311
See application file for complete search history.

(56) References Cited

U.S. PATENT DOCUMENTS

| | | | |
|---|---|---|---|
| 2008/0293426 A1* | 11/2008 | Kim et al. | 455/450 |
| 2009/0163216 A1* | 6/2009 | Hoang et al. | 455/450 |
| 2009/0180414 A1* | 7/2009 | Maeda et al. | 370/311 |
| 2010/0061356 A1* | 3/2010 | Qvarfordt et al. | 370/338 |
| 2010/0182942 A1* | 7/2010 | Kim et al. | 370/311 |
| 2012/0015657 A1* | 1/2012 | Comsa et al. | 455/436 |
| 2012/0052793 A1* | 3/2012 | Brisebois et al. | 455/1 |
| 2012/0106349 A1* | 5/2012 | Adjakple et al. | 370/241 |

FOREIGN PATENT DOCUMENTS

| | | |
|---|---|---|
| WO | 2010077001 A2 | 7/2010 |
| WO | 2010124865 A2 | 11/2010 |

OTHER PUBLICATIONS

Ashraf et al., "Power savings in small cell deployments via sleep mode techniques", IEEE 21st International Symposium on Personal, Indoor and Mobile Radio Communications Workshops (PIMRC WORKSHOPS), Sep. 26, 2010, pp. 307-311, XP031837067, ISBN: 978-1-4244-9117-9.
International Search Report and Written Opinion—PCT/US2011/058800—ISA/EPO—Mar. 28, 2012.

* cited by examiner

*Primary Examiner* — Erika A Washington
(74) *Attorney, Agent, or Firm* — Jeffrey D. Jacobs

(57) ABSTRACT

Systems, methods, devices, and computer program products are described for discontinuous transmissions in a wireless communications system. In one example, a femtocell uses out-of-band (OOB) signals to detect the presence of user equipment (UEs) in a femtocell coverage area. In response to the detection, the femtocell may transmit in-band signals to facilitate communication with and registration of the detected UE. The femtocell may then perform discontinuous in-band transmissions to the registered UE.

46 Claims, 12 Drawing Sheets

DISCONTINUOUS TRANSMISSION IN FEMTOCELLS

BACKGROUND

The following relates generally to wireless communication, and more specifically to discontinuous downstream transmissions in a femtocell. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile terminals. Base stations may communicate with mobile terminals on downstream and upstream links. Each base station has a coverage range, which may be referred to as the coverage area of the cell. In cellular deployments, the macrocell is used to describe a cell serving a wide region such as rural, suburban, and urban areas. A "femtocell" is a smaller cell, typically deployed for use in a home, small business, building, or other limited region. It often is connected to a service provider's network via a broadband connection. In 3GPP terms, femtocells may be referred to as Home Node Bs (HNB) for UMTS (WCDMA, or High Speed Packet Access (HSPA)) and Home eNode Bs (HeNB) for LTE.

Femtocell transmissions may cause intercellular interference to other femtocells or macrocells deployed in the same frequency. This interference may degrade the capacity and user perceived performance in those cells. Intercellular interference may be caused when a femtocell continuously transmits in-band signals to facilitate discovery of the femtocell by user equipment (UEs). However, not all of the continuous in-band transmissions may be necessary. Transmitting excessive in band signals may adversely impact power consumption at an HNB/HeNB and cause interference at neighboring cells.

SUMMARY

The described features generally relate to one or more improved systems, methods, and/or apparatuses for discontinuous downstream transmissions in femtocells. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

Systems, methods, devices, and computer program products are described for discontinuous transmissions in a wireless communications system. In one example, a femtocell uses out-of-band (OOB) signals to detect the presence of a UE in a femtocell coverage area. In response to the detection, the femtocell may transmit in-band signals to facilitate communication with and registration of the detected UE. The femtocell may perform discontinuous in-band transmissions to the registered UE.

An exemplary method of wireless communication in a femtocell includes: detecting a presence of user equipment (UE) in the femtocell coverage area using an out-of-band (OOB) femto-proxy; registering the UE at the femtocell responsive to the detected presence; and performing discontinuous in-band transmissions to the registered UE, the discontinuous in-band transmissions comprising a series of wake-up and powered-down states.

Examples of such a method may include one or more of the following features: performing discontinuous in-band transmissions comprising control information before detecting the presence of the UE; registering a second UE, the second UE requesting registration responsive to the discontinuous in-band transmissions comprising control information; disabling the discontinuous in-band transmissions comprising control information responsive to the detection of the UE and performing in-band transmissions to signal the UE to discover the femtocell base station; changing a discontinuous cycle time of the discontinuous in-band transmissions comprising control information to a different cycle time for the discontinuous in-band transmissions to the registered UE; and transitioning, before detecting the presence of the UE, the in-band transmissions to a static deactivated state while the OOB signals are being transmitted to detect the UE.

Also or alternatively, examples may include modifying a discontinuous transmission cycle in response to the proximity detection by the OOB femto-proxy, wherein the discontinuous in-band transmissions to the registered UE comprise scheduling wake-up periods for transmission to the UE; synchronizing a wake-up periods at the femtocell for transmissions to the UE and a plurality of other registered terminals; setting a discontinuous cycle time and wake-up period timing for downstream transmissions to UEs in idle mode in the femtocell; setting a discontinuous cycle time and wake-up period timing for downstream transmissions to UEs in connected mode in the femtocell; setting, after the discontinuous cycle time and wake-up period timing is set for the UEs in connected mode, a discontinuous cycle time and wake-up period timing for UEs in idle mode in the femtocell, the discontinuous cycle time and wake-up period timing for the UEs in idle mode set to cause wake-up periods in idle mode to substantially overlap a subset of the wake-up periods in connected mode; determining discontinuous reception timing for the UE and a plurality of other registered UEs and matching the wake-up states to the determined reception timing; wherein the method is performed by a plurality of networked devices, the in-band frequencies are useable for communication with a macrocell in addition to communication with the femtocell, and the OOB signals are Bluetooth signals; wherein, the method is performed by a plurality of networked devices, and the in-band frequencies are useable for communication with a macrocell in addition to communication with the femtocell; and wherein the method is performed by a plurality of networked devices; and the OOB signals are Bluetooth signals.

An exemplary apparatus for wireless communications in a femtocell includes: one or more antennas; a transceiver coupled with the one or more antennas, and configured to transmit and receive in band and out-of-band (OOB) transmissions; a femto-proxy module, communicatively coupled with the transceiver, and configured to detect a presence of user equipment (UE) in the femtocell using OOB signals; and a femtocell access point, communicatively coupled with the femto-proxy module and the transceiver, and configured to:

register the UE at the femtocell responsive to the detected presence, and generate discontinuous in-band transmissions directed to the registered UE comprising a series of wake-up and powered-down states. The femtocell access point may further be configured to: generate discontinuous in-band transmissions comprising control information before detecting the presence of the UE, wherein the femtocell access point is further configured to disable the discontinuous in-band transmissions comprising control information upon detection of the UE; and generate continuous in-band transmissions upon detection of the UE to signal the UE to discover the femtocell.

Examples of such an apparatus may include one or more of the following features: a discontinuous transmission control module communicatively coupled with the femtocell access point, and configured to: change a discontinuous cycle time of the discontinuous in-band transmissions comprising control information to a different cycle time for the discontinuous in-band transmissions to the registered UE. The discontinuous transmission control module may be configured to change the discontinuous cycle time when the UE is transitioned to idle mode, or to connected mode. The discontinuous transmission control module may be configured to trigger, before the detection of the presence of the UE, the femtocell access point to enter a static deactivated state while the OOB signals are being transmitted to detect the UE, or modify a discontinuous transmission cycle in response to the proximity detection by the femto-proxy module.

The femtocell access point may be configured to: transmit access parameters to the UE during a wake-up state, wherein the discontinuous in-band transmissions to the registered UE comprise scheduling wake-up periods for transmission to the UE, synchronize wake-up periods for the femtocell access point for transmissions to the UE and a plurality of other registered terminals, determine discontinuous reception timing for the UE and a plurality of other registered UEs, match the wake-up states to the determined reception timing. The apparatus may be a home node B using a femto-proxy system, and the registration may be performed using in-band transmissions.

An apparatus may include: means for detecting a presence of user equipment (UE) in the femtocell coverage area using out-of-band (OOB) signals; means for registering the UE at the femtocell responsive to the detected presence; means for performing discontinuous in-band transmissions to the registered UE comprising a series of wake-up and powered-down states. The apparatus may also include means for changing a discontinuous cycle time responsive to the detection; means for changing a discontinuous cycle time of the discontinuous in-band transmissions comprising control information to a different cycle time for the discontinuous in-band transmissions to the registered UE in idle mode; means for deactivating discontinuous in-band transmissions while the OOB signals are being transmitted to detect the UE; means for modifying a discontinuous transmission cycle in response to the proximity detection by the OOB femto-proxy; or means for synchronizing a wake-up cycle at the femtocell for transmissions to the UE and a plurality of other registered terminals, wherein the apparatus is a femto-proxy system, the in-band frequencies are useable for communication with a microcell in addition to communication with the femtocell, and the OOB signals are Bluetooth signals.

An exemplary processor for wireless communication in a femtocell may perform the following: detect a presence of user equipment (UE) in a femtocell coverage area using out-of-band (OOB) signals; register the UE at the femtocell responsive to the detected presence; perform discontinuous in-band transmissions to the registered UE comprising a series of wake-up and powered-down state. The processor may change, responsive to the detection, a discontinuous cycle time of the discontinuous in-band transmissions comprising control information to a different cycle time for the discontinuous in-band transmissions to the registered UE; change a discontinuous cycle time of the discontinuous in-band transmissions in an idle mode to a different cycle time for the discontinuous in-band transmissions in a connected mode; synchronize a wake-up cycle at the femtocell for transmissions to the UE and a plurality of other registered terminals; or signal the UE and the plurality of other registered terminals for discontinuous receptions at the synchronized cycle time.

An exemplary computer program product residing on a processor-readable medium and comprising processor-readable instructions may detect a presence of user equipment (UE) in a femtocell coverage area using an out-of-band (OOB) femto-proxy; register the UE at the femtocell responsive to the detected presence; and perform discontinuous in-band transmissions to the registered UE comprising a series of wake-up and powered-down states.

An exemplary method of wireless communication in a femtocell includes: setting a discontinuous cycle time and wake-up period timing for downstream transmissions to user equipment (UEs) in connected mode in the femtocell; and setting, after the discontinuous cycle time and wake-up period timing is set for the UEs in connected mode, a discontinuous cycle time and wake-up period timing for UEs in idle mode in the femtocell, the discontinuous cycle time and wake-up period timing for the UEs in idle mode set to cause wake-up periods in idle mode to substantially overlap a subset of the wake-up periods in connected mode. The discontinuous cycle time for UEs in connected mode may be shorter than UEs in idle mode, The setting the wake-up period timing for UEs in idle mode in the femtocell may include: aligning a start of a wake-up period for UEs in idle mode with a start of the wake-up period for the UEs in connected mode. The wake-up period duration for UEs in idle mode may be substantially equal to the wake-up period for the UEs in connected mode. The discontinuous cycle time for UEs in idle mode may be substantially equal to an integer multiple of the discontinuous cycle time for UEs in connected mode.

DETAILED DESCRIPTION

Figure 1:
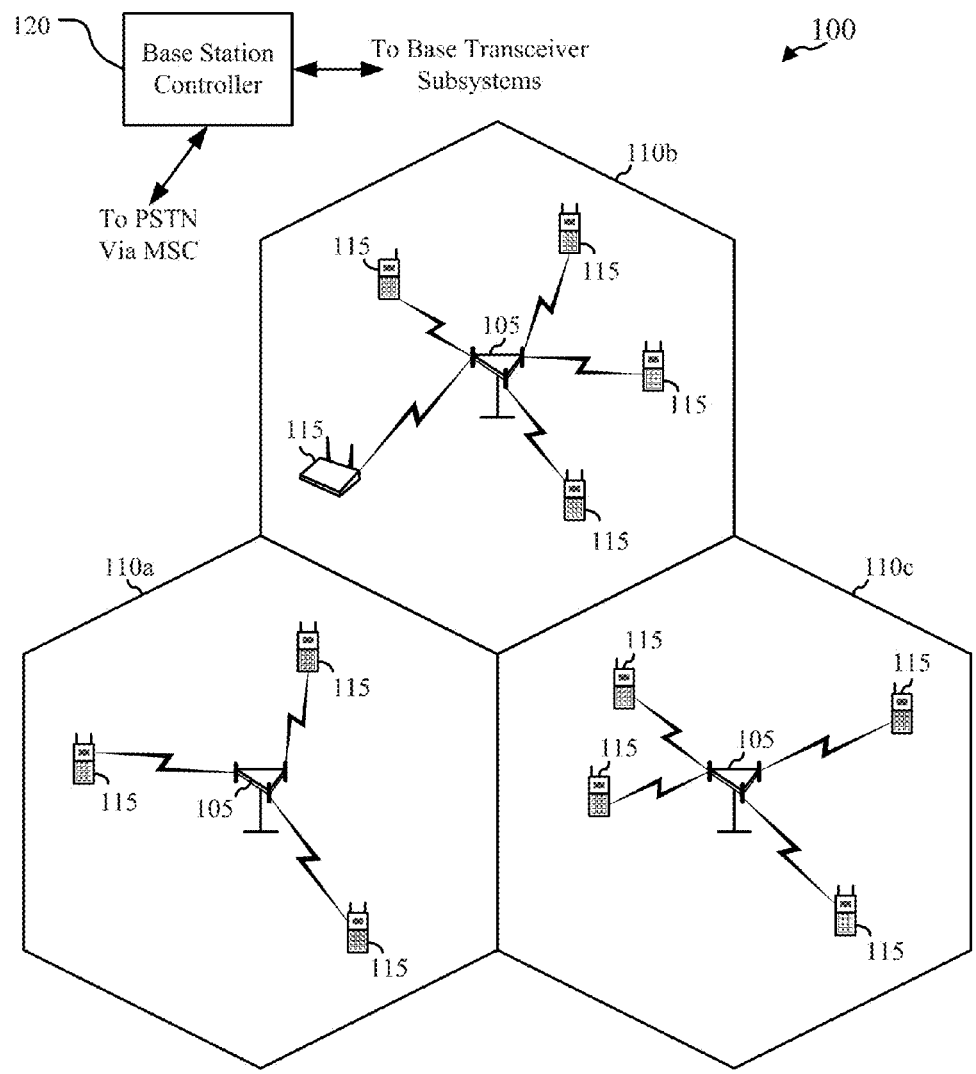
FIG. 1 shows a block diagram of a wireless communications system.

Management of discontinuous downstream transmissions in a wireless communications system is described. When no users are registered at a femtocell, the femtocell may use out-of-band (OOB) signals and discontinuous transmissions of in-band control information (e.g., pilot signals) to facilitate discovery of the femtocell by user equipment (UEs). In one example, the femtocell detects the presence of a UE in a femtocell coverage area using the OOB signals. In response to the detection, the femtocell may transmit a set of continuous in-band signals to facilitate communication with and registration of the detected UE. The registered UE may enter idle mode, and the femtocell may perform discontinuous in-band transmissions to the registered UE. When the UE enters the connected mode, the femtocell may modify the cycle of the discontinuous transmissions.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1x EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

Referring first to FIG. 1, a block diagram illustrates an example of a wireless communications system 100. The system 100 includes base transceiver stations (BTSs) 105, disposed in cells 110, mobile user equipment 115 (UEs), and a base station controller (BSC) 120. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry control information (e.g., pilot signals), overhead information, data, etc. The system 100 may be a multi-carrier LTE network capable of efficiently allocating network resources.

The BTSs 105 may wirelessly communicate with the UEs 115 via a base station antenna. The BTSs 105 are configured to communicate with the UEs 115 under the control of the BSC 120 via multiple carriers. Each of the BTSs 105 can provide communication coverage for a respective geographic area, here the cell 110-*a*, 110-*b*, or 110-*c*. The system 100 may include BTSs 105 of different types (e.g., macro, micro, and/or pico base stations).

The UEs 115 may be dispersed throughout the cells 110. The UEs 115 may be referred to as mobile stations, mobile devices, access terminals (ATs), or subscriber units. The UEs 115 here include cellular phones and wireless communications devices, but may also include personal digital assistants (PDAs), other handheld devices, netbooks, notebook computers, etc.

For the discussion below, the UEs 115 operate on (are "camped" on) a macro or similar network facilitated by multiple BTSs 105 (for ease in explanation hereinafter, macro BTSs 105 and a macro communications network will be used for purposes of example, while noting that the principles may be applied to micro or pico cells, as well). Each macro BTS 105 may cover a relatively large geographic area (e.g., several kilometers in radius) and may allow unrestricted access by terminals with service subscription. A portion of the UEs 115 are also registered to operate on at least one femtocell facilitated by a "femto" or "home" BTS.

The UE 115 may generally operate using an internal power supply, such as a small battery, to facilitate highly mobile operation. Strategic deployment of network devices, such as femtocells, may be used to mitigate mobile device power consumption. For example, femtocells may be utilized to provide service within areas which might not otherwise experience adequate or even any service (e.g., due to capacity limitations, bandwidth limitations, signal fading, signal shadowing, etc.), thereby allowing UEs 115 to reduce searching times, to reduce transmit power, to reduce transmit times, etc. Femtocells (e.g., femto BTSs 105) provide service within a relatively small service area (e.g., within a house or building). Accordingly, a UE 115 is typically disposed near a femtocell when being served, often allowing the UE 115 to communicate with reduced transmission power.

By way of example, the femtocell may be implemented as a Home Node B ("HNB") located in a user premises, such as a residence, an office building, etc. HNB is used hereinafter generically to describe any femtocell access point, and should not be interpreted as limiting. The HNB location may be chosen for maximum coverage (e.g., in a centralized location), to allow access to a global positioning satellite (GPS) signal (e.g., near a window), or in other locations. The disclosure herein assumes that a set of UEs 115 are registered on (e.g., on a whitelist of) a single HNB that provides coverage over substantially an entire user premises. The "home" HNB provides the UEs 115 with access to communication services via a connection to the macro communications network. As used herein, the macro communications network is assumed to be a wireless wide-area network (WWAN). As such, terms like "macro communications network" and "WWAN network" are interchangeable. Similar techniques may be applied to other types of network environments, HNB coverage topologies, etc., without departing from the scope of the disclosure or claims.

In example configurations, the HNB may be integrated with one or more out-of-band (OOB) proxies as a femto-proxy system. As used herein, "out-of-band," or "OOB," includes any type of communications that are out of band with respect to the macro communications network (or a micro or pico cell, as applicable). For example, the OOB proxies and/or the UEs 115 may be configured to operate using Bluetooth (e.g., class 1, class 1.5, and/or class 2), ZigBee (e.g., according to the IEEE 802.15.4-2003 wireless standard), and/or any other useful type of communications out of the macro network band.

OOB integration with the HNB may provide a number of features. For example, the OOB proxies may allow for reduced interference, lower power HNB registration, and/or reselection, etc. Further, the integration of OOB functionality with the HNB may allow the UEs 115 associated with the HNB to also be part of an OOB piconet. The piconet may facilitate enhanced HNB functionality, other communications services, power management functionality, and/or other features to the UEs 115. These and other features will be further appreciated from the description below.

Figure 2A:
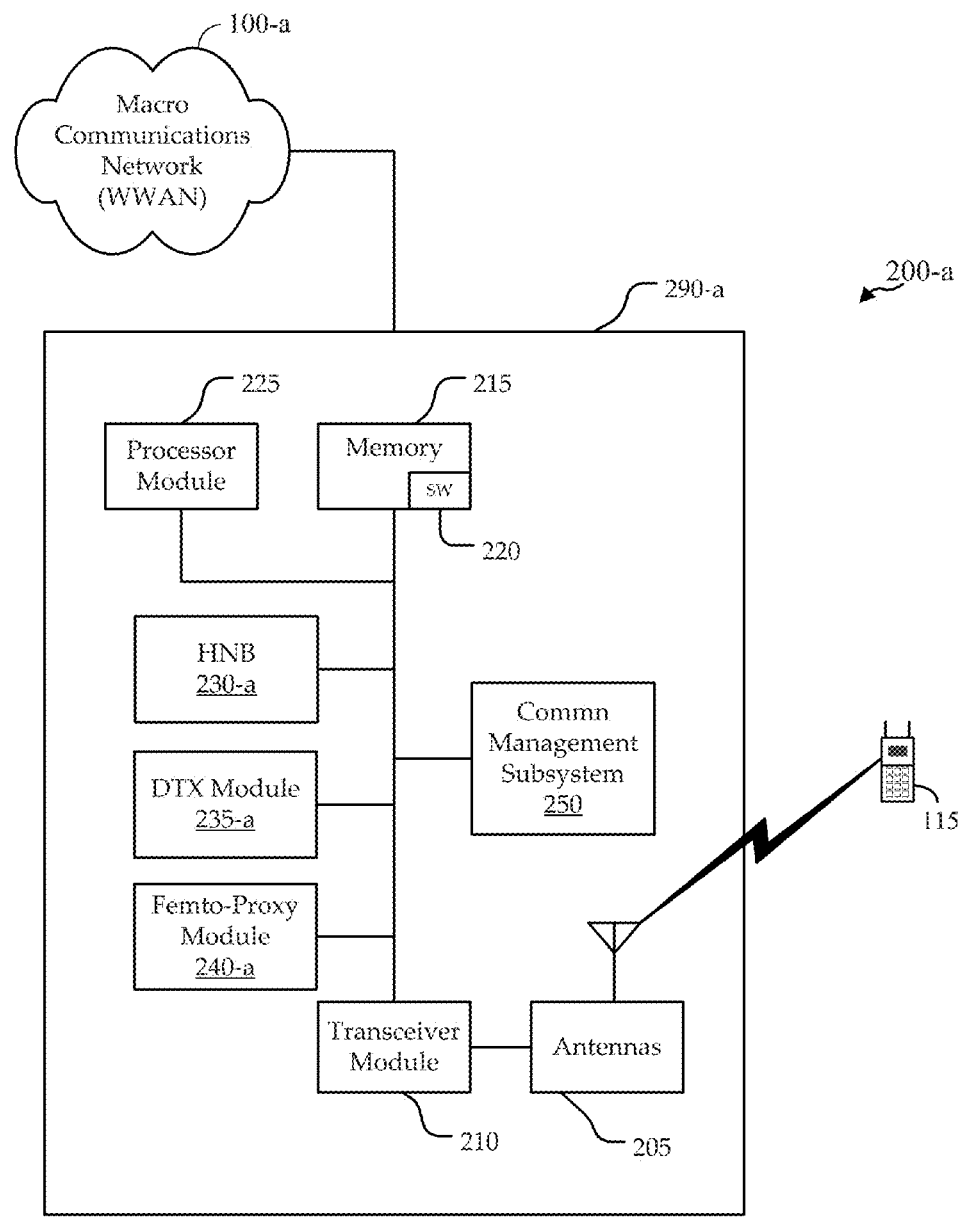
FIG. 2A shows a block diagram of an exemplary wireless communications system that includes a femto-proxy system.

FIG. 2A shows a block diagram of a wireless communications system 200-a that includes a femto-proxy system 290-a. The femto-proxy system 290-a may be integrated into a single device, or be made up of a number of networked devices (i.e., a number of different devices in communication with each other, directly or indirectly, providing the functionality of the femto-proxy system 290-a). The femto-proxy system 290-a includes a femto-proxy module 240-a, a DTX module 235-a, an HNB 230-a, and a communications management subsystem 250. The HNB 230-a may be a femto BTS. The femto-proxy system 290-a also includes antennas 205, a transceiver module 210, memory 215, and a processor module 225, which each may be in communication, directly or indirectly, with each other (e.g., over one or more buses). The transceiver module 210 is configured to communicate bi-directionally, via the antennas 205, with the UEs 115. The transceiver module 210 (and/or other components of the femto-proxy system 290-a) is also configured to communicate bi-directionally (e.g., through a wired or wireless link) with a macro communications network 100-a (e.g., a WWAN). The macro communications network 100-a may be the communications system 100 of FIG. 1.

The memory 215 may include random access memory (RAM) and read-only memory (ROM). The memory 215 may store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225 but be configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The transceiver module 210 may include a modem configured to modulate the packets and provide the modulated packets to the antennas 205 for transmission, and to demodulate packets received from the antennas 205. While some examples of the system 290-a may include a single antenna, the system 290-a may include multiple antennas 205 for multiple links. For example, one or more links may be used to support macro network communications with the UEs 115. Also, one or more OOB links may be supported by the same antenna or different antennas 205.

Notably, the femto-proxy system 290-a is configured to provide both HNB 230-a and femto-proxy module 240-a functionality. In one example, the femto-proxy module 240-a may detect the presence of a UE in the femtocell using out-of-band (OOB) signals. The HNB 230-a may register the UE at the femtocell responsive to the detected presence, and generate discontinuous in-band transmissions directed to the registered UE.

Thus, the HNB 230-a may operate in a discontinuous transmission mode, transmitting control information (e.g., system information broadcasts (SIBs) and/or pilot signals) periodically. A discontinuous transmission mode may include a wake-up state, wherein the HNB 230-a is actively generating transmission bursts, and a powered-down state, wherein the HNB 230-a is powered off, deactivated, or otherwise operating in a lowered power mode. The wake-up and powered-down states may alternate, and the cycle time may vary depending on a variety of factors. The DTX module 235-a may set the cycle timing. For example, the DTX module 235-a may change the cycle time of the discontinuous signaling when UE's 115 presence is detected, when the UE 115 is registered, when a registered UE 115 enters idle mode, and when a UE 115 in idle mode transitions to connected mode. Moreover, the DTX module 235-a may modify cycle periods within connected mode depending upon the type of communication occurring.

Consider an example wherein the femtocell has no UE 115 registered. The femto-proxy module 240-a may transmit OOB signals to attempt to communicate with and detect UEs 115 that enter the femtocell coverage area. Concurrently, the HNB 230-a may operate in a discontinuous transmission mode, transmitting control information to facilitate the discovery of the femtocell by a UE 115 entering the coverage area.

The presence of a UE 115 in the femtocell coverage area may be detected using the OOB signaling. For example, a UE 115 may receive the OOB signals, and communicate with the femto-proxy module 240-a (e.g., requesting service). The femto-proxy module 240-a may thereby detect the presence of the UE 115 in the femtocell coverage area, and trigger the HNB 230-a to wake-up (e.g., interrupting the current DTX cycle and causing an early exit from the powered-down state). The discontinuous transmission of the control information may be disabled, and the HNB 230-a may begin continuous transmissions to facilitate discovery of and registration in the femtocell by the UE 115. An alternative approach could be for the DTX schedule of the femtocell to be communicated to the UE 115 over the OOB link. In this case, there is no need to interrupt the current femtocell DTX schedule.

There are a number of alternative scenarios. For example, if a UE 115 is not proxy enabled, the UE 115 may nonetheless be signaled by the HNB 230-a through the discontinuous transmission of control information (although there may be some delay if the signaling occurs while the HNB 230-a is in powered-down state). The neighboring macrocells/femtocells can include the DTX schedule of the femtocell in their system information block (SIBs) broadcasted in the cell in order to inform a UE 115 in the cell about the femtocell's DTX control information. In one example, the HNB 230-*a* may operate in a static powered-down mode when the femtocell has no UEs 115 registered. In this case, the femto-proxy module 240-*a* may trigger the HNB 230-*a* to become active (and transmit in-band signals to facilitate discovery of the femtocell) when the presence of a UE 115 is detected.

The UEs 115 detected in the coverage area (whether via in-band or OOB signaling) may be registered (e.g., via continuous or discontinuous in-band signals transmitted by the HNB 230-*a*), then enter an idle mode. The HNB 230-*a* may register the detected UEs 115, and transmit access parameters and scheduling information to the UE 115 (e.g., with discontinuous in-band transmissions). In one example, UEs may have discontinuous reception cycles of 640, 1280, 2560, or 5120 ms. The DTX module 235-*a* may set the timing cycles for the HNB 230-*a*. As new UEs 115 enter the femtocell coverage area, they may trigger HNB 230-*a* wake-up based on OOB signaling and presence detection, or alternatively, may register based on discontinuous in-band transmission of control information.

In one example, the UE's 115 discontinuous reception cycles may be determined by UE 115 IDs (e.g., UE's IMSI). Thus, the wake-up time and transmission cycles may be tailored to match the discontinuous reception cycle of each UE 115, and thus be dictated by such IDs. However, this may require the HNB 230-*a* to wake up more often to match the discontinuous reception cycle for each registered UE 115. In another example, the discontinuous reception cycles for UEs 115 may be determined by the DTX module 235-*a*, and the HNB 230-*a* may transmit control information to synchronize the discontinuous reception cycles for each registered UE 115. This alignment can produce additional power savings by extending the time between cycles.

When a UE 115 transitions to connected mode, the discontinuous reception cycle time may be modified (and thus changing discontinuous transmission times for the HNB 230-*a*). The discontinuous reception cycles may be as follows as currently defined in the 3GPP standards for WCDMA/HSPA systems:
  DRX cycle in CELL_DCH—8 to 40 ms
  DRX cycle in CELL_FACH—40 to 320 ms
  DRX cycle in CELL_PCH—320 to 2560 ms
In one example, as set forth above, the UE's 115 discontinuous reception cycle may be determined by UE 115 IDs (e.g., the Cell Radio Network Identifier (C-RNTI) or the HS-DSCH Radio Network Identifier (HRNTI) in UMTS). Thus, the wake-up time and transmission cycles may be dictated by such IDs. However, this may require the HNB 230-*a* to wake up even more often in connected mode to match the discontinuous reception cycle for each registered UE 115. In another example, the discontinuous reception (DRX) cycles for UEs 115 may be determined by the DTX module 235-*a*, and the HNB 230-*a* may transmit control information to synchronize the discontinuous reception cycles for each registered UE 115 in both idle and connected mode (with some measure of overlap). This alignment of UEs 115 in connected mode, or in both connected mode and idle mode, can produce additional power savings by extending the cycle time. In one example, a first UE 115 enters connected mode, and a DRX cycle dictated by the HNB is used for accessing the network. As other UEs 115 enter connected mode, the DRX cycles for those UEs 115 is synchronized with the first UE 115. The UEs 115 in idle mode may synchronize their DRX cycle with the first UE 115, although their reception cycles may be extended.

From the perspective of the UE 115, as it approaches the femtocell coverage area, the UE's 115 OOB radio may begin receiving signals from or search for the OOB femto-proxy module 240-*a*. Upon discovery, the UE 115 may recognize that it is in proximity to the femtocell coverage area, and a scan for the HNB 230-*a* may commence.

The scan for the HNB 230-*a* may be implemented in different ways. For example, due to the femto-proxy module 240-*a* discovery by the UE's 115 OOB radio, both the UE 115 and the femto-proxy system 290-*a* may be aware of each other's proximity. The UE 115 scans for the HNB 230-*a*. Alternatively, the HNB 230-*a* can poll for the UE 115 (e.g., individually, or as part of a round-robin polling of all registered UEs 115), and the UE 115 listens for the poll. When the scan for the HNB 230-*a* is successful, the UE 115 may register with the HNB 230-*a*.

When the UE 115 is in the femtocell coverage area and registered with the HNB 230-*a*, the UE 115 may be in communication with the macro communications network 100-*a* via the HNB 230-*a*. As described above, the UE 115 may also be a slave of a piconet for which the femto-proxy module 240-*a* acts as the master. For example, the piconet may operate using Bluetooth and may include Bluetooth communications links facilitated by a Bluetooth radio (e.g., implemented as part of the transceiver module 210) in the HNB 230-*a*.

The HNB 230-*a* may have various configurations of base station or wireless access point equipment. As used herein, the HNB 230-*a* may be a device that communicates with various terminals (e.g., client devices (UE 115, etc.), proximity agent devices, etc.) and may also be referred to as, and include some or all the functionality of, a base station, a Node B, and/or other similar devices. Although referred to herein as the HNB 230-*a*, the concepts herein may be applicable to access point configurations other than femtocell configuration (e.g., picocells, microcells, etc.). Examples of the HNB 230-*a* utilize communication frequencies and protocols native to a corresponding cellular network (e.g., the macro communications network 100-*a*, or a portion thereof) to facilitate communication within a femtocell coverage area associated with the HNB 230-*a* (e.g., to provide improved coverage of an area, to provide increased capacity, to provide increased bandwidth, etc.).

The HNB 230-*a* may be in communication with other interfaces not explicitly shown in FIG. 2A. For example, the HNB 230-*a* may be in communication with a native cellular interface as part of the transceiver module 210 (e.g., a specialized transceiver utilizing cellular network communication techniques that may consume relatively large amounts of power in operation) for communicating with various appropriately configured devices, such as the UE 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the HNB 230-*a* may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the HNB 230-*a* may, directly or indirectly, be in communication with one or more OOB interfaces as part of the transceiver module 210 and/or the femto-proxy module 240-*a*. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the UE 115. The OOB interface may, for example, be a Bluetooth-compliant transceiver that uses a time-division duplex (TDD) scheme. The OOB link may be an ultra-wideband (UWB) link, an IEEE 802.11 link, ZigBee link, an IP tunnel, a wired link, etc. Moreover, virtual OOB links may be used, such as through use of IP-based mechanisms over a wireless wide area network (WWAN) link (e.g., IP tunnel over a WWAN link) that act as a virtual OOB link.

The terms "high power" and "low power" as used herein are relative terms and do not imply a particular level of power consumption. Accordingly, OOB devices (e.g., OOB femto-proxy module 240-*a*) may simply consume less power than native cellular interface (e.g., for communications with the macrocell) for a given time of operation. In some implementations, OOB interfaces may also provide relatively lower bandwidth communications, relatively shorter range communication, and/or consume relatively lower power in comparison to the macro communications interfaces. There is no limitation that the OOB devices and interfaces be low power, short range, and/or low bandwidth.

Femto-proxy modules 240-*a* may provide various types of OOB functionality and may be implemented in various ways. A femto-proxy module 240-*a* may have any of various configurations, such as a stand-alone processor-based system, or a processor-based system integrated with a host device (e.g., access point, gateway, router, switch, repeater, hub, concentrator, etc.), etc.

Certain femto-proxy modules 240-*a* may also include one or more backend network interfaces as part of the transceiver module 210 (e.g., packet switched network interface, switched network interface, radio network interface, control network interface, a wired link, and/or the like) for communicating with various devices or networks. For example, the femto-proxy module 240-*a* may be in communication with the HNB 230-*a* and/or other macro BTSs 105 of the macro communication network 100-*a* through backend network interfaces. A femto-proxy module 240-*a* that is integrated within a host device, such as with HNB 230-*a*, may utilize an internal bus or other such communication interface in the alternative to a backend network interface to provide communications between the femto-proxy module 240-*a* and those other networks or devices, if desired. Additionally or alternatively, other interfaces, such as OOB interfaces, native cellular interfaces, etc., may be utilized to provide communication between the femto-proxy module 240-*a* and the HNB 230-*a* and/or other devices or networks.

Various communications functions (e.g., including those of the HNB 230-*a* and/or the femto-proxy module 240-*a*) may be managed using the communications management subsystem 250. For example, the communications management subsystem 250 may at least partially handle communications with the macrocell (e.g., WWAN), one or more OOB networks (e.g., piconets, UE 115 OOB radios, other femto-proxies, OOB beacons, etc.), one or more other femtocells, UEs 115, etc. The communications management subsystem 250 may be a component of the femto-proxy system 290-*a* in communication with some or all of the other components of the femto-proxy system 290-*a* via a bus.

Various other architectures are possible other than those illustrated by FIG. 2A. The HNB 230-*a* and femto-proxy module 240-*a* may or may not be collocated, integrated into a single device, configured to share components, etc. For example, the femto-proxy system 290-*a* of FIG. 2A has an integrated HNB 230-*a* and femto-proxy module 240-*a* that at least partially share components, including the antennas 205, the transceiver module 210, the memory 215, and the processor module 225.

Figure 2B:
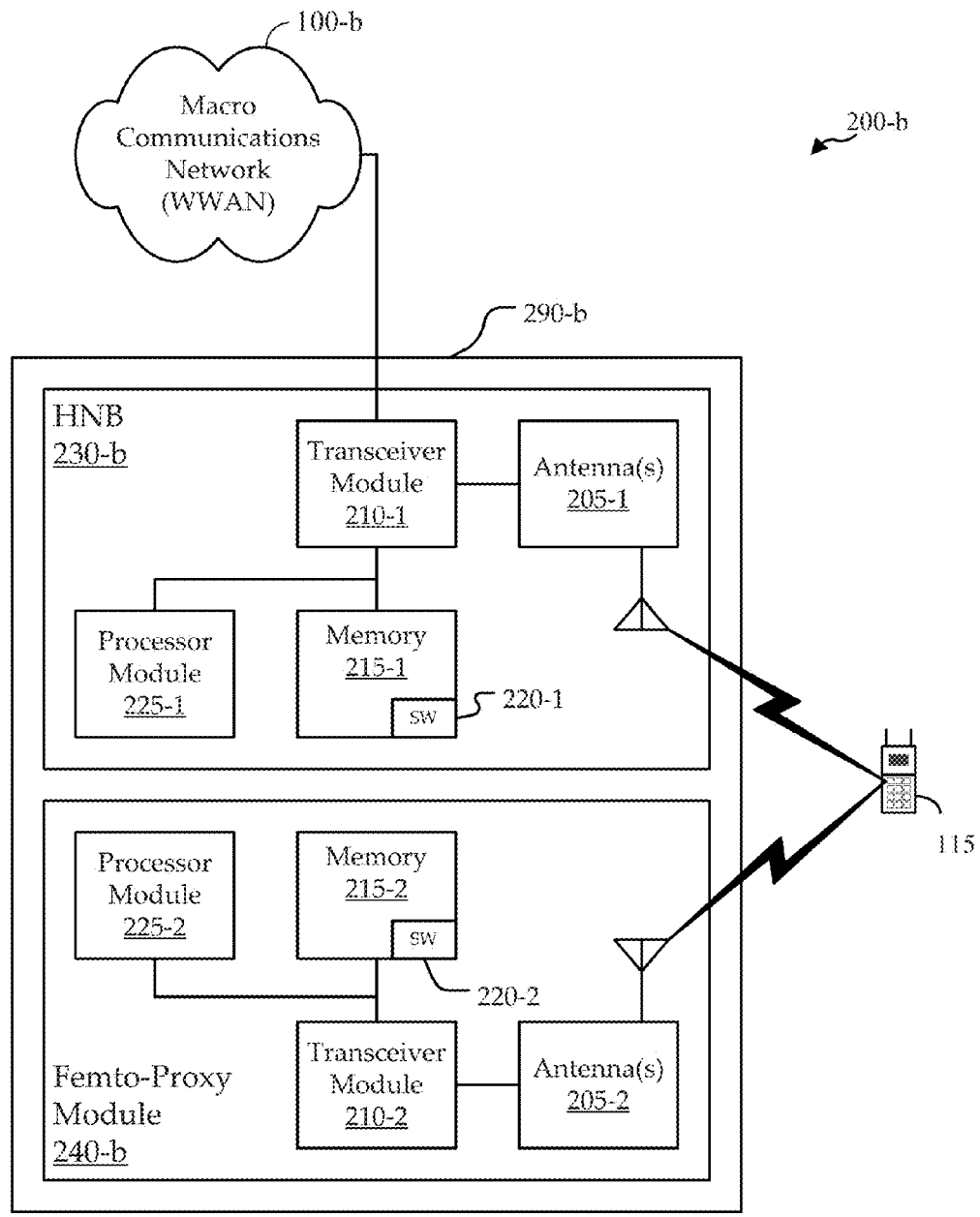
FIG. 2B shows a block diagram of an exemplary wireless communications system that includes an alternative architecture of a femto-proxy system.

FIG. 2B shows a block diagram of a wireless communications system 200-*b* that includes an architecture of a femto-proxy system 290-*b* that is different from the architecture shown in FIG. 2A. Similar to the femto-proxy system 290-*a*, the femto-proxy system 290-*b* includes a femto-proxy module 240-*b* and an HNB 230-*b*. Unlike the system 290-*a*, however, each of the femto-proxy module 240*b* and the HNB 230-*b* has its own antennas 205, transceiver module 210, memory 215, and processor module 225. The functionality of the DTX module 235-*a* is integrated with the HNB 230-*b* in this embodiment. Both transceiver modules 210 are configured to communicate bi-directionally, via their respective antennas 205, with UEs 115. The transceiver module 210-1 of the HNB 230-*b* is illustrated in bi-directional communication with the macro communications network 100-*b*.

For the sake of illustration, the femto-proxy system 290-*b* is shown without a separate communications management subsystem 250. In some configurations, a communications management subsystem 250 is provided in both the femto-proxy module 240-*b* and the HNB 230-*b*. In other configurations, the communications management subsystem 250 is implemented as part of the femto-proxy module 240-*b*. In still other configurations, functionality of the communications management subsystem 250 is implemented as a computer program product (e.g., stored as software 220 in memory 215) of one or both of the femto-proxy module 240-*b* and the HNB 230-*b*.

As discussed more specifically above, the femto-proxy system 290-*b* is configured to provide both HNB 230-*b* and femto-proxy module 240-*b* functionality. The HNB 230-*b* and femto-proxy module 240-*b* may have the same or similar functionality as described with reference to the HNB 230-*a* and femto-proxy module 240-*a*. Thus, in one example, the femto-proxy module 240-*b* may detect the presence of a UE 115 in the femtocell using out-of-band (OOB) signals. The HNB 230-*b* may register the UE 115 at the femtocell responsive to the detected presence, and generate discontinuous in-band transmissions directed to the registered UE 115.

The HNB 230-*b* may operate in a number of different discontinuous transmission modes, transmitting periodic information. A discontinuous transmission mode may include a wake-up state, wherein the HNB 230-*b* is actively generating transmission bursts, and a powered-down state, wherein the HNB 230-*b* is powered off, deactivated, or otherwise operating in a lowered power mode. The wake-up and powered-down states may alternate, and the cycle time may vary depending on a variety of factors. The DTX module 235-*a* may set the cycle timing. A variety of different information may be transmitted during the wake-up states, including control information (e.g., SIBs and/or pilot signals), discontinuous transmission scheduling information (e.g., start times and/or cycle periods), and received communication information (e.g., voice data, messaging data, etc.).

The HNB 230-*b* may perform discontinuous in-band transmissions with control information (e.g., including SIBs/pilot signals) concurrently with the transmission of OOB signals from the femto-proxy module 240-*b*. A UE 115 may discover a femtocell responsive to receiving either the OOB signals or discontinuous in-band pilot signal transmissions. Thus, the HNB 230-*b* may register UEs 115 that have received either in-band or OOB signals from femto-proxy system 290-b. If the presence of a UE 115 is detected via OOB signals, the discontinuous in-band transmissions from the HNB 230-b may be temporarily disabled, and the HNB 230-b may perform continuous in-band transmissions to signal the UE 115 to discover the femtocell.

As noted above, the HNB 230-b may modify a discontinuous transmission cycle in response to the proximity detection using the OOB signals. For example, the HNB 230-b may change discontinuous cycle time of the discontinuous in-band transmissions used to facilitate femtocell discovery to a different cycle time for the discontinuous in-band transmissions to the registered UE 115. There may be cycle periods of different lengths depending on whether a UE 115 is in idle mode or connected mode, and different cycle periods within connected mode depending on the type of communication being undertaken.

It is worth noting that, when no UEs 115 have registered, the HNB 230-b may transition to a static deactivated state while the OOB signals are being transmitted to detect a UE 115, and in-band transmissions suspended until the presence of a UE 115 is detected.

Figure 3:
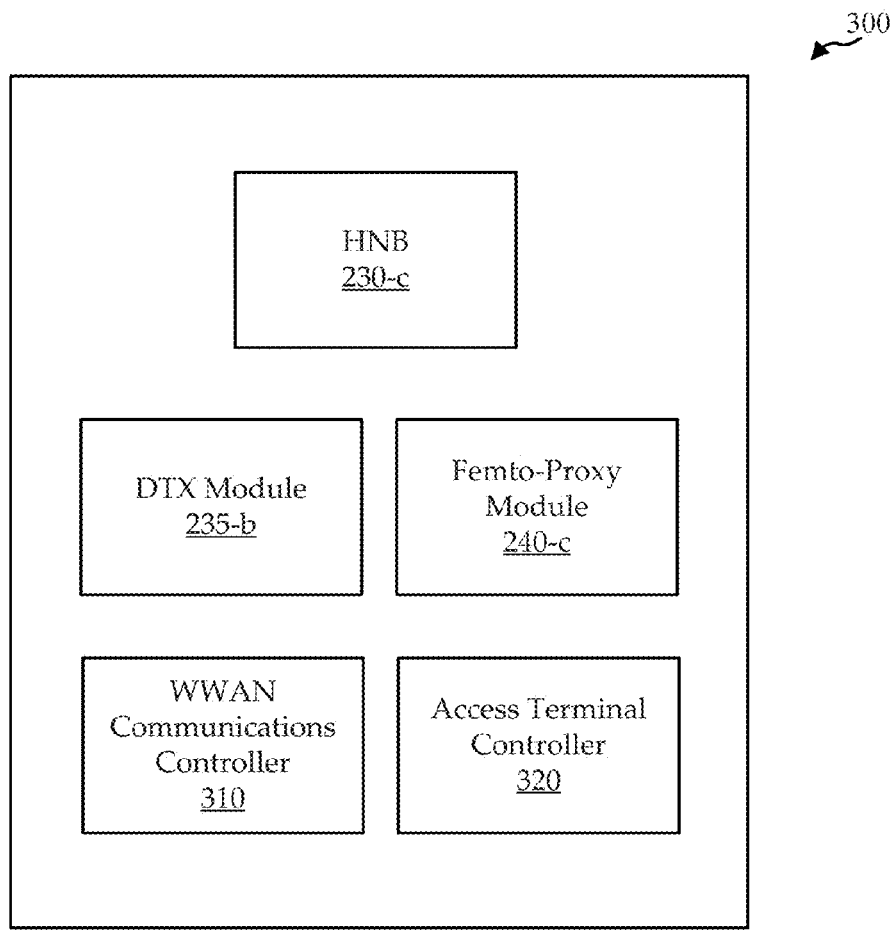
FIG. 3 shows a block diagram of an example of a processor module for implementing functionality of the communications management subsystem.

Referring next to FIG. 3, a block diagram illustrates an example of certain components of a processor module 300. The processor module 300 may be used in femtocell (e.g., in a home Node B), and have some or all of the functionality described with reference to the femto-proxy system of FIG. 2A or 2B. Thus, the processor module 300 may include some or all of the functionality of the HNB 230, DTX module 235-a, femto-proxy module 240, and communications management subsystem 250 of FIG. 2A or 2B. The processor module 300 includes a WWAN communications controller 310, UE controller 320, HNB 230-c, DTX module 235-b, and femto-proxy module 240-c. The WWAN communications controller 310 is configured to receive a WWAN communication (e.g., a page) for a designated UE 115. The UE controller 320 determines how to handle the communication, including affecting operation of the HNB 230-c and/or the femto-proxy module 240-c. The HNB 230-c, DTX module 235-b and femto-proxy module 240-c may have the same or similar functionality the HNB 230, DTX module 235-a, and femto-proxy module 240 described with reference to FIG. 2A or 2B.

The components of the processor module 300 of FIG. 3 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each module may include memory, or accessed memory may be elsewhere on (e.g., memory 215 of FIG. 2A or 2B) on or off the processor module 300.

The HNB 230 of FIGS. 2A and 2B is illustrated as providing a communications link to the macro communications network 100-a. However, the HNB 230 may provide communications functionality via many different types of networks and/or topologies. For example, the HNB 230 of FIG. 2A, 2B, or 3 may provide a wireless interface for a cellular telephone network, a cellular data network, a local area network (LAN), a metropolitan area network (MAN), a wide area network (WAN), the public switched telephone network (PSTN), the Internet, etc.

Figure 4:
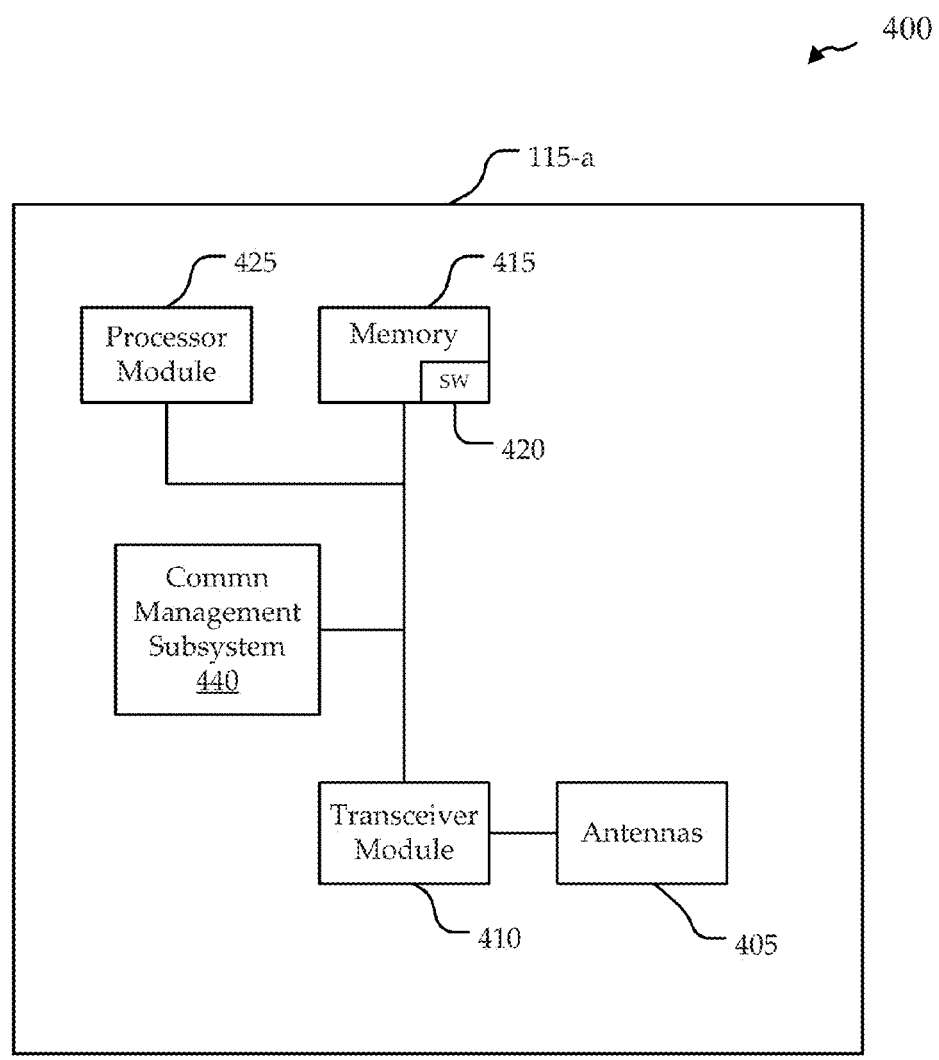
FIG. 4 shows a block diagram of an example of a UE.

As described above, the femto-proxy systems may be configured to communicate with client devices, including the UEs 115. FIG. 4 shows a block diagram 400 of mobile user equipment (UE) 115-a for use with the femto-proxy systems 290 of FIGS. 2A and 2B or in a femtocell implementing processor module 300 of FIG. 3. The UE 115-a may have any of various configurations, such as personal computers (e.g., laptop computers, netbook computers, tablet computers, etc.), cellular telephones, PDAs, digital video recorders (DVRs), internet appliances, gaming consoles, e-readers, etc. The UE 115-a may have a mobile configuration, having an internal power supply (not shown), such as a small battery, to facilitate mobile operation.

The UE 115-a includes antennas 405, a transceiver module 410, memory 415, and a processor module 425, which each may be in communication, directly or indirectly, with each other (e.g., via one or more buses). The transceiver module 410 is configured to communicate bi-directionally, via the antennas 405 and/or one or more wired or wireless links, with one or more networks, as described above. For example, the transceiver module 410 is configured to communicate bi-directionally with BTSs 105 of the macro communications network (e.g., the communications system 100 of FIG. 1, 2A, or 2B) and, in particular, with at least one femtocell (e.g., the HNB 230 of FIG. 2A, 2B, or 3).

As generally referenced above, the transceiver module 410 may be configured to further communicate over one or more OOB links. For example, the transceiver module 410 communicates with a femto-proxy system 290 (e.g., as described with reference to FIGS. 2A and 2B) over both an in-band (e.g., macro) link to the HNB 230 and at least one OOB link to the femto-proxy module 240. The transceiver module 410 may include a modem configured to modulate the packets and provide the modulated packets to the antennas 405 for transmission, and to demodulate packets received from the antennas 405. While the UE 115-a may include a single antenna, the UE 115-a will typically include multiple antennas 405 for multiple links.

The memory 415 may include random access memory (RAM) and read-only memory (ROM). The memory 415 may store computer-readable, computer-executable software code 420 containing instructions that are configured to, when executed, cause the processor module 425 to perform various functions described herein (e.g., call processing, database management, message routing, etc.). Alternatively, the software 420 may not be directly executable by the processor module 425 but be configured to cause the computer, e.g., when compiled and executed, to perform functions described herein.

The processor module 425 may include an intelligent hardware device, e.g., a central processing unit (CPU) such as those made by Intel® Corporation or AMD®, a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision or withholding/suppression of the packet itself providing the indication of whether a user is speaking According to the architecture of FIG. 4, the UE 115-a further includes a communications management subsystem

440. The communications management subsystem 440 may manage communications with a macro communications network (e.g., WWAN), one or more OOB networks (e.g., piconets, femto-proxy modules 240, etc.), one or more femtocells (e.g., HNBs 230), other UEs 115 (e.g., acting as a master of a secondary piconet), etc. For example, the communications management subsystem 440 may be a component of the UE 115-a in communication with some or all of the other components of the UE 115-a via a bus. Alternatively, functionality of the communications management subsystem 440 may be implemented as a component of the transceiver module 410, as a computer program product, and/or as one or more controller elements of the processor module 425.

The UE 115-a includes communications functionality for interfacing with both the macro communications network (e.g., cellular) and one or more OOB networks. For example, some UEs 115-a include native cellular interfaces as part of the transceiver module 410 or the communications management subsystem 440 (e.g., a transceiver utilizing cellular network communication techniques that consume relatively large amounts of power in operation) for communicating with other appropriately configured devices (e.g., for establishing a link with a macro communication network via HNB 230) through a native cellular wireless link. The native cellular interfaces may operate according to one or more communication standards, including, but not limited to, W-CDMA, CDMA2000, GSM, WiMax, and WLAN. It is also worth noting that non-OOB enabled devices detect the system via in-band DTX signals, as described below.

Furthermore, the UE 115-a may also include OOB interfaces implemented as part of the transceiver module 410 and/or the communications management subsystem 440 (e.g., a transceiver that may consume relatively low amounts of power in operation and/or may cause less interference than in the in-band spectrum) for communicating with other appropriately configured devices through a wireless link. One example of a suitable OOB communication interface is a Bluetooth-compliant transceiver that uses a time-division duplex (TDD) scheme.

Figure 5A:
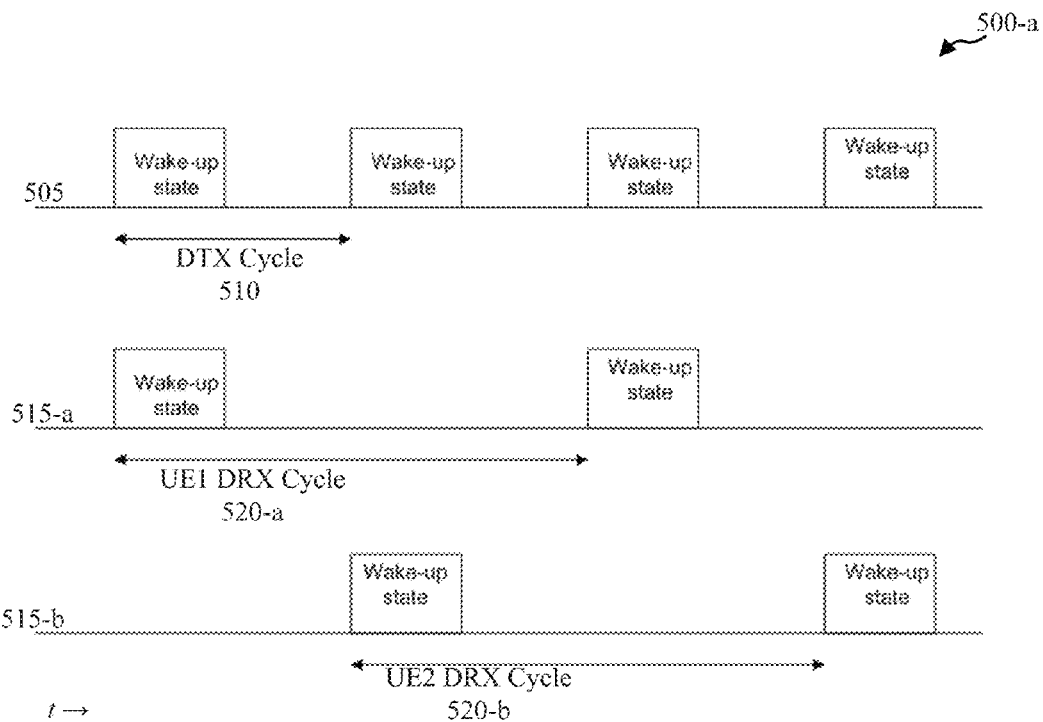
FIGS. 5A, 5B, and 5C show timing diagrams for discontinuous transmission at a femtocell.

FIG. 5A illustrates timing diagrams 500-a for discontinuous transmission at a femtocell. The timing diagrams illustrate an example timing scheme when UEs are in idle mode. Timing diagram 505 illustrates the wake up timing for discontinuous transmissions from an HNB. This may be the HNB 230 of FIG. 2A, 2B, or 3. Timing diagrams 515-a and 515-b illustrate the wake-up timing for discontinuous reception at a UE (such as the UE 115-a of FIG. 4).

In this example, each UE's discontinuous reception cycle 520 is determined by UE IDs (e.g., a MAC address). Thus, the reception cycles may not overlap. Thus, the wake-up time and discontinuous transmission cycle 510 for the HNB is tailored to match the discontinuous reception cycle of each UE 115, and thus be dictated by such IDs. However, this may require the HNB 230-a to wake up more often to match the discontinuous reception cycle for each registered UE, possibly wasting power and causing unnecessary interference. In this case, the discontinuous reception cycle time is driving the wake-up cycle for the HNB.

Figure 5B:
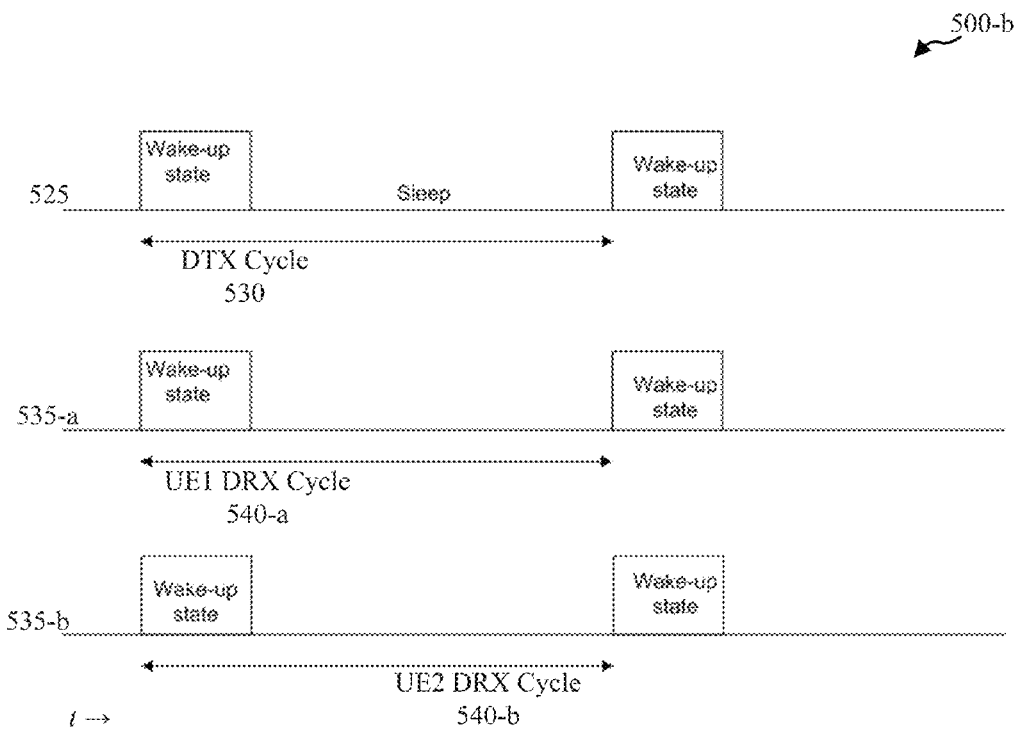

FIG. 5B illustrates timing diagrams 500-b for discontinuous transmission at a femtocell with an alternative scheme. The timing diagrams 500-b illustrate example timing when UEs are in idle mode. Timing diagram 525 illustrates the wake-up timing for discontinuous transmissions from an HNB. This may be the HNB 230 of FIG. 2A, 2B, or 3. Timing diagrams 535-a and 535-b illustrate the wake-up timing for discontinuous reception at a UE (such as the UE 115-a of FIG. 4).

In this example, the discontinuous reception cycles 540 for UEs may be determined by the HNB (instead of the UE IDs). The HNB may transmit control information to synchronize the timing and cycle length for discontinuous reception cycles 540 for each registered UE. This alignment may extend the HNB cycle 530, increasing the time between wake-ups. This can produce additional power savings and reduce intercellular interference.

Figure 5C:
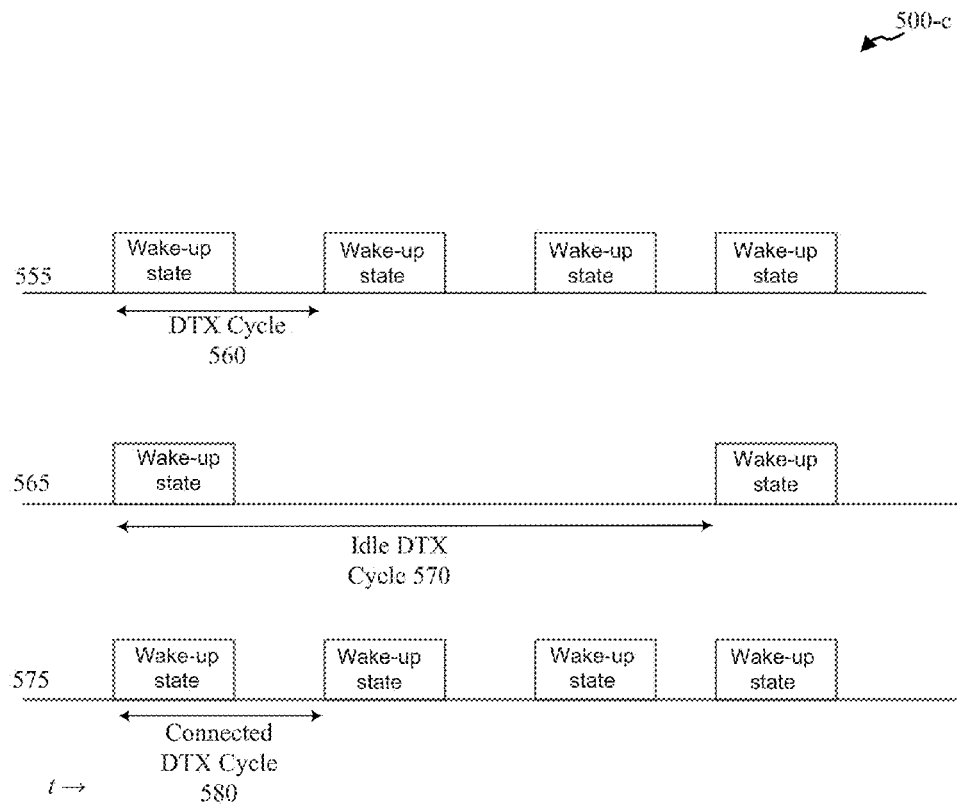

FIG. 5C illustrates timing diagrams 500-c for discontinuous transmission at a femtocell with another alternative scheme. The timing diagrams illustrate example timing when one UE is in idle mode and one UE is in connected mode. Timing diagram 555 illustrates the wake-up timing for discontinuous transmissions from an HNB. This may be the HNB 230 of FIG. 2A, 2B, or 3. Timing diagram 565 illustrates the wake-up timing for discontinuous reception at a UE in idle mode, while timing diagram 575 illustrates the wake-up timing for discontinuous reception at a UE in connected mode.

In this example, the discontinuous reception cycles for UEs may be determined by the HNB (instead of the UE IDs). The HNB may transmit control information to synchronize the timing and cycle length for discontinuous reception cycles 640 for each registered UE, even across modes. In one example, the connected mode schedule is first determined and then the idle mode schedule is determined. This is to avoid disruption to connected mode UEs which could be transmitting/receiving traffic to/from the femtocell. Thus, the discontinuous cycle time and wake-up period timing for downstream transmissions to UEs in connected mode in a femtocell may be set first. Then, the discontinuous cycle time and wake-up period timing for UEs in idle mode in the femtocell may be set to cause wake-up periods in idle mode to substantially overlap a subset of the wake-up periods in connected mode. This alignment allows for overlap and may extend the HNB cycle, increasing the time between wake-ups and the power efficiency. This can produce additional power savings and reduce intercellular interference.

Figure 6:
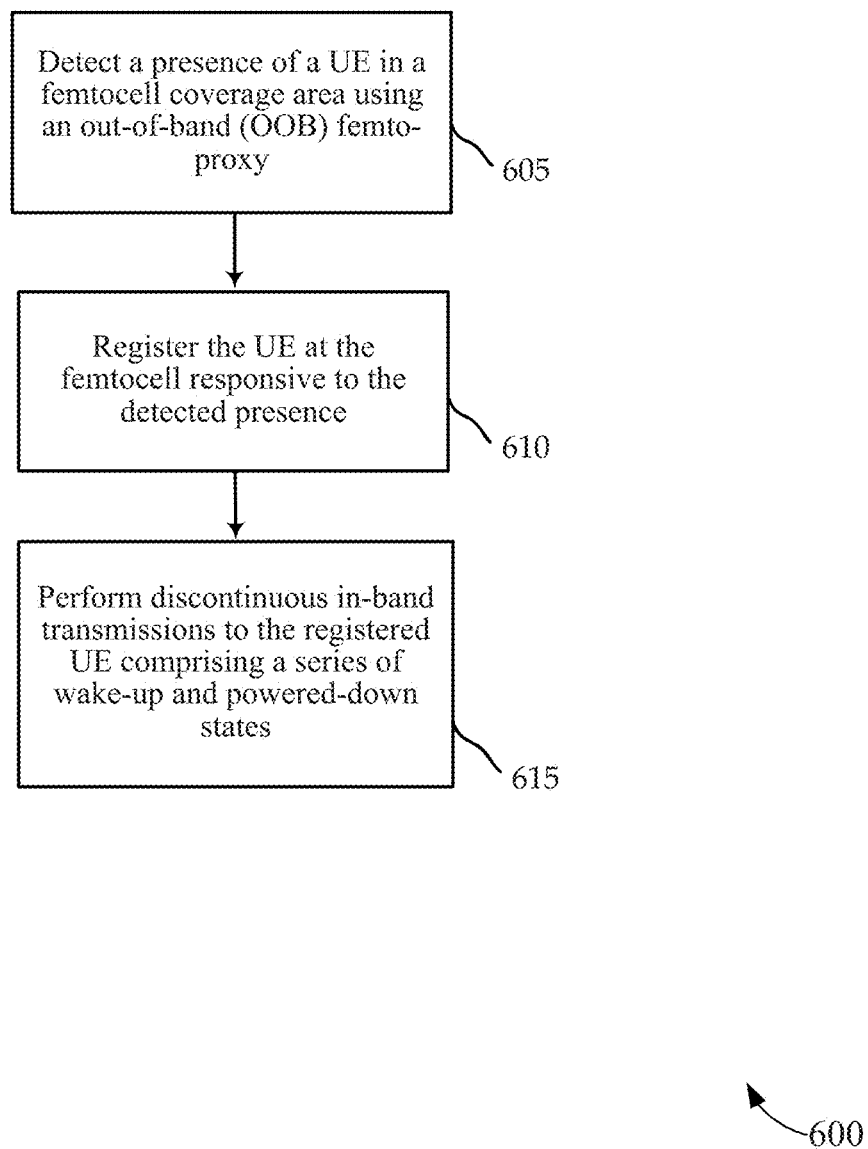
FIG. 6 is a flowchart of a method for discontinuous downstream transmissions at a femtocell.

FIG. 6 is a flowchart of a method 600 for discontinuous downstream transmissions at a femtocell. The method 600 may be performed, for example, in whole or in part, by the femto-proxy system 290 of FIG. 2A or 2B, or by the processor 300 of FIG. 3. The method 600 may, more specifically, be performed by the HNB 230 and femto-proxy module 240 of FIG. 2A, 2B, or 3.

At stage 605, the presence of a UE in a femtocell coverage area is detected using an OOB femto-proxy. At stage 610, the UE is registered at the femtocell responsive to the detected presence. At block 615, discontinuous in-band transmissions to the registered UE are performed, the discontinuous transmissions made up of a series of wake-up and powered-down states.

Figure 7:
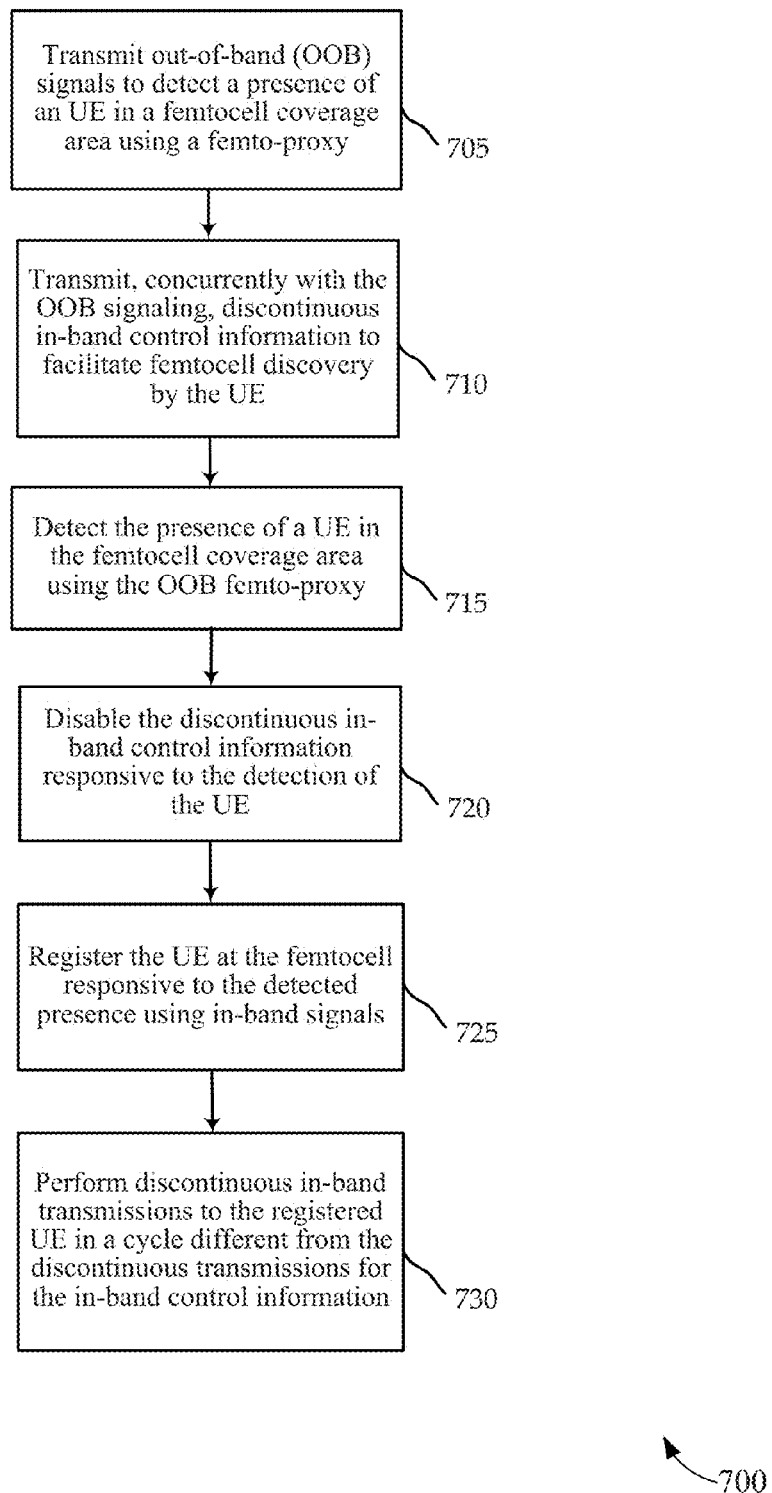
FIG. 7 is a flowchart of a method for discontinuous downstream transmissions in a femtocell using dynamically changing timing cycles.

FIG. 7 is a flowchart of a method 700 for discontinuous downstream transmissions in a femtocell using dynamically changing timing cycles. The method 700 may be performed, for example, in whole or in part, by the femto-proxy system 290 of FIG. 2A or 2B, or by the processor 300 of FIG. 3. The method 700 may, more specifically, be performed by the HNB 230 and femto-proxy module 240 of FIG. 2A, 2B, or 3.

At stage 705, OOB signals are transmitted to detect a presence of a UE in a femtocell coverage area using a femto-proxy. At stage 710, concurrently with the OOB signaling, discontinuous in-band control information is transmitted to facilitate femtocell discovery by the UE. At stage 715, the presence of a UE in a femtocell is detected using the OOB femto-proxy. At stage 720, the transmission of discontinuous in-band control information is disabled responsive to the detection of the UE. At stage 725, the UE is registered at the femtocell responsive to the detected presence using in-band signals. At stage 730, discontinuous in-band transmissions to the registered UE are performed in a cycle different from the discontinuous transmissions for the in-band pilot signals.

Figure 8:
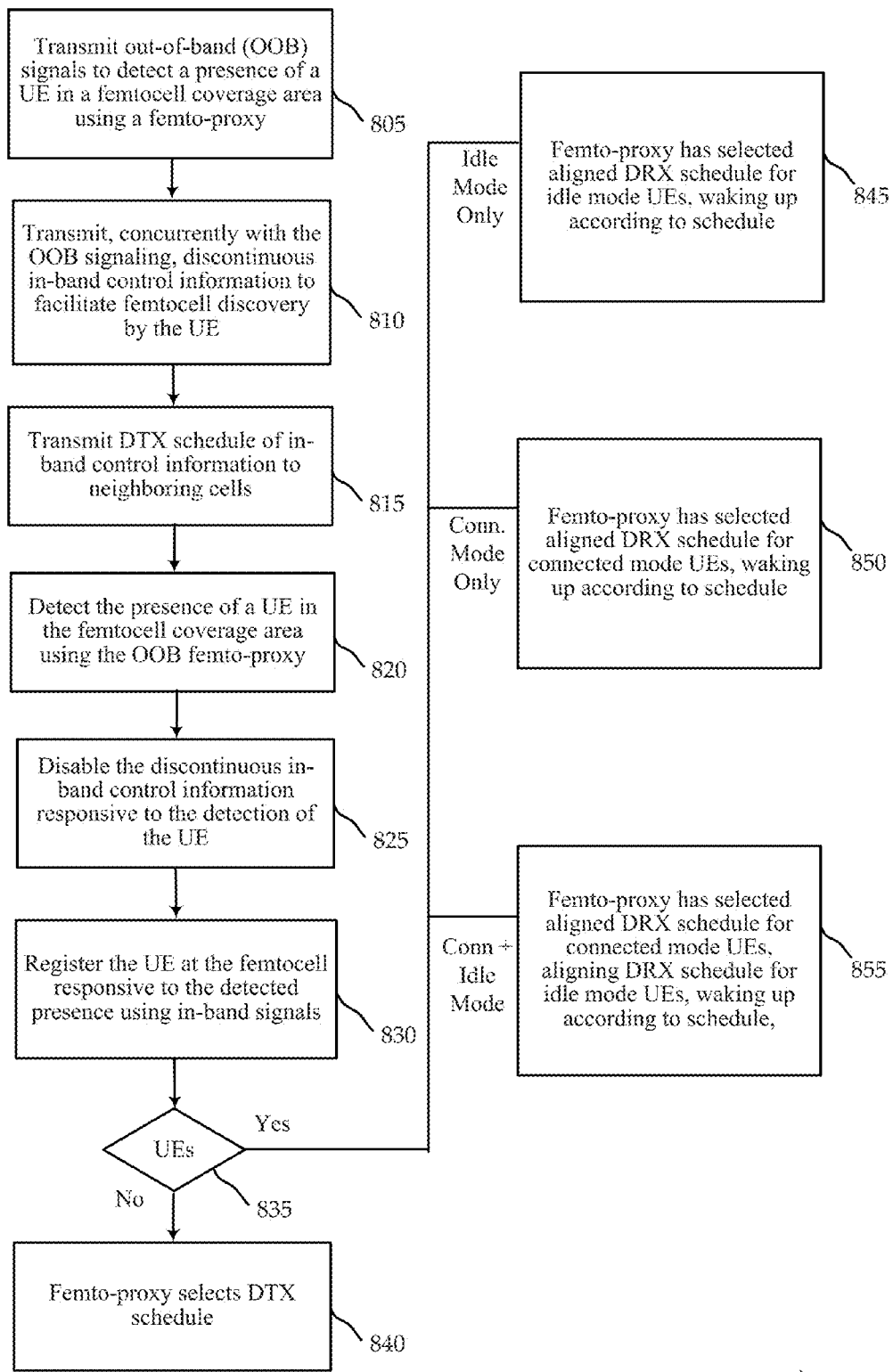
FIG. 8 is a flowchart of a method for discontinuous downlink transmissions in a femtocell using various timing cycle alignment techniques.

FIG. 8 is a flowchart of a method 800 for discontinuous downstream transmissions in a femtocell using various timing cycle alignment techniques. The method 800 may be performed, for example, in whole or in part, by the femto-proxy system 290 of FIG. 2A or 2B, or by the processor 300 of FIG. 3. The method 800 may, more specifically, be performed by the HNB 230 and femto-proxy module 240 of FIG. 2A, 2B, or 3.

At stage 805, OOB signals are transmitted to detect a presence of a UE in a femtocell coverage area using a femto-proxy. At stage 810, concurrently with the OOB signaling, discontinuous in-band control information is transmitted to facilitate femtocell discovery by the UE. At stage 815, the DTX schedule of in-band control information is transmitted to neighboring cells. At stage 820, the presence of a UE in a femtocell is detected using the OOB femto-proxy. At stage 825, the transmission of discontinuous in-band control information is disabled responsive to the detection of the UE. At stage 830, the UE is registered at the femtocell responsive to the detected presence using in-band signals. At stage 835, a determination is made whether other UEs are present in the femtocell. If not, at stage 840, the femto-proxy selects the timing for the DTX schedule.

If UEs are present, a determination is made whether the UEs in the femtocell are in idle or connected mode. At stage 845, if all are in idle mode, the femto-proxy selects an aligned DRX schedule for idle mode UEs, waking up according to schedule. At stage 850, if all are in connected mode, the femto-proxy selects an aligned DRX schedule for connected mode UEs, the femto-proxy waking up according to schedule. At stage 855, if there are idle mode and connected UEs, the femto-proxy first selects an aligned DRX schedule for connected mode UEs, the align a DRX schedule for idle mode UEs, and the femto-proxy wakes up according to schedule.

Figure 9:
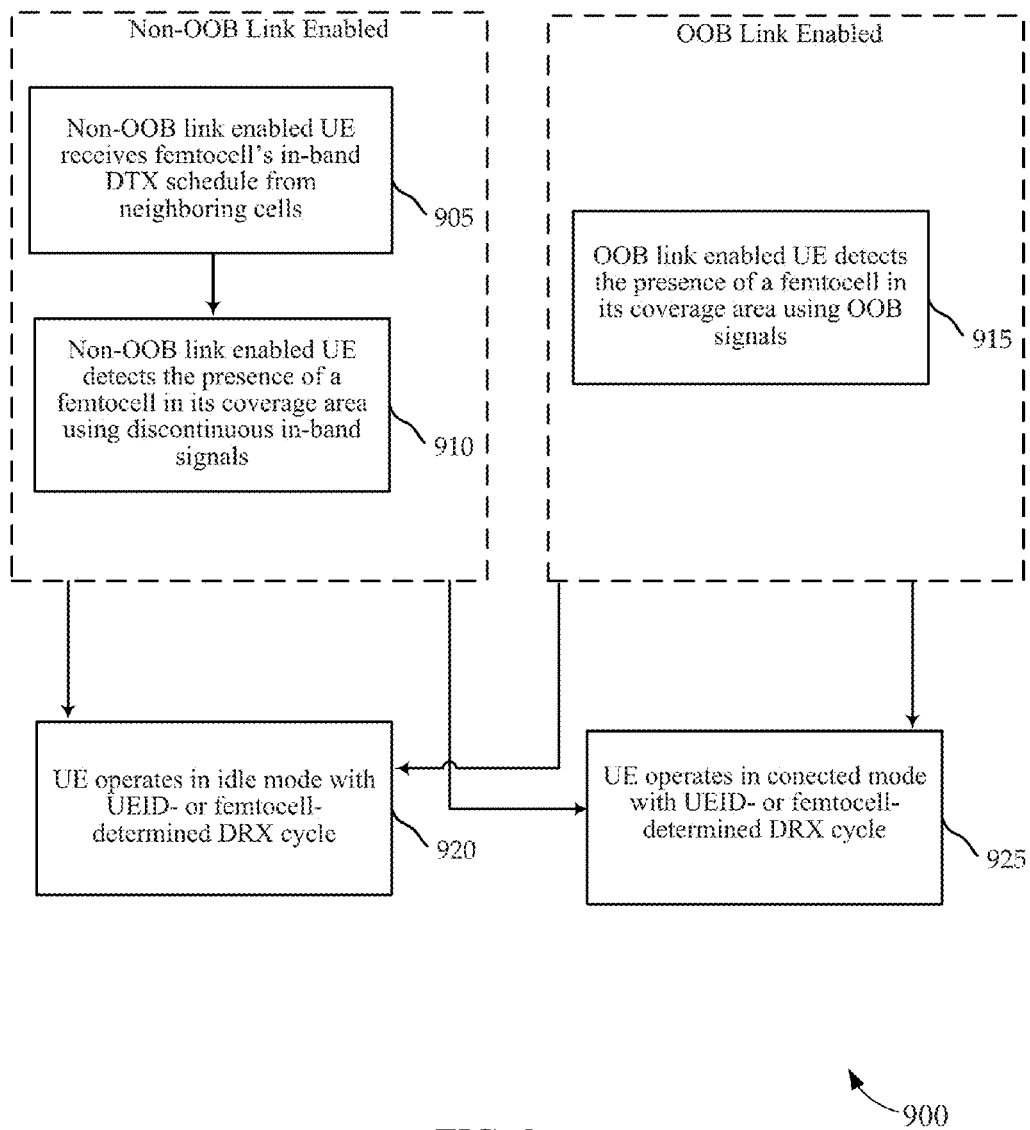
FIG. 9 is a flowchart of a method for discontinuous downlink transmissions in a femtocell for differently configured UEs.

FIG. 9 is a flowchart of a method for discontinuous downstream transmissions in a femtocell for differently configured UEs. The method 900 may be performed, for example, in whole or in part, by the femto-proxy system 290 of FIG. 2A or 2B, or by the processor 300 of FIG. 3. The method 900 may, more specifically, be performed by the HNB 230 and femto-proxy module 240 of FIG. 2A, 2B, or 3.

At stage 905, a non-OOB link-enabled UE receives a femtocell's in-band DTX schedule from neighboring cells. At stage 910, a non-OOB link-enabled UE detects the presence of a femtocell in its coverage area using discontinuous in-band signals. At stage 915, an OOB link-enabled UE detects the presence of a femtocell in its coverage area using OOB signals. Whether the UE is non-OOB link-enabled or OOB link-enabled, the options may be the same upon registering with the femtocell. For each type of UE, at stage 920, the UE may operate in idle mode with a UEID- or femtocell-determined DRX cycle. Also, each type of UE may, at stage 925, operate in connected mode with a UEID- or femtocell-determined DRX cycle.

Figure 10:
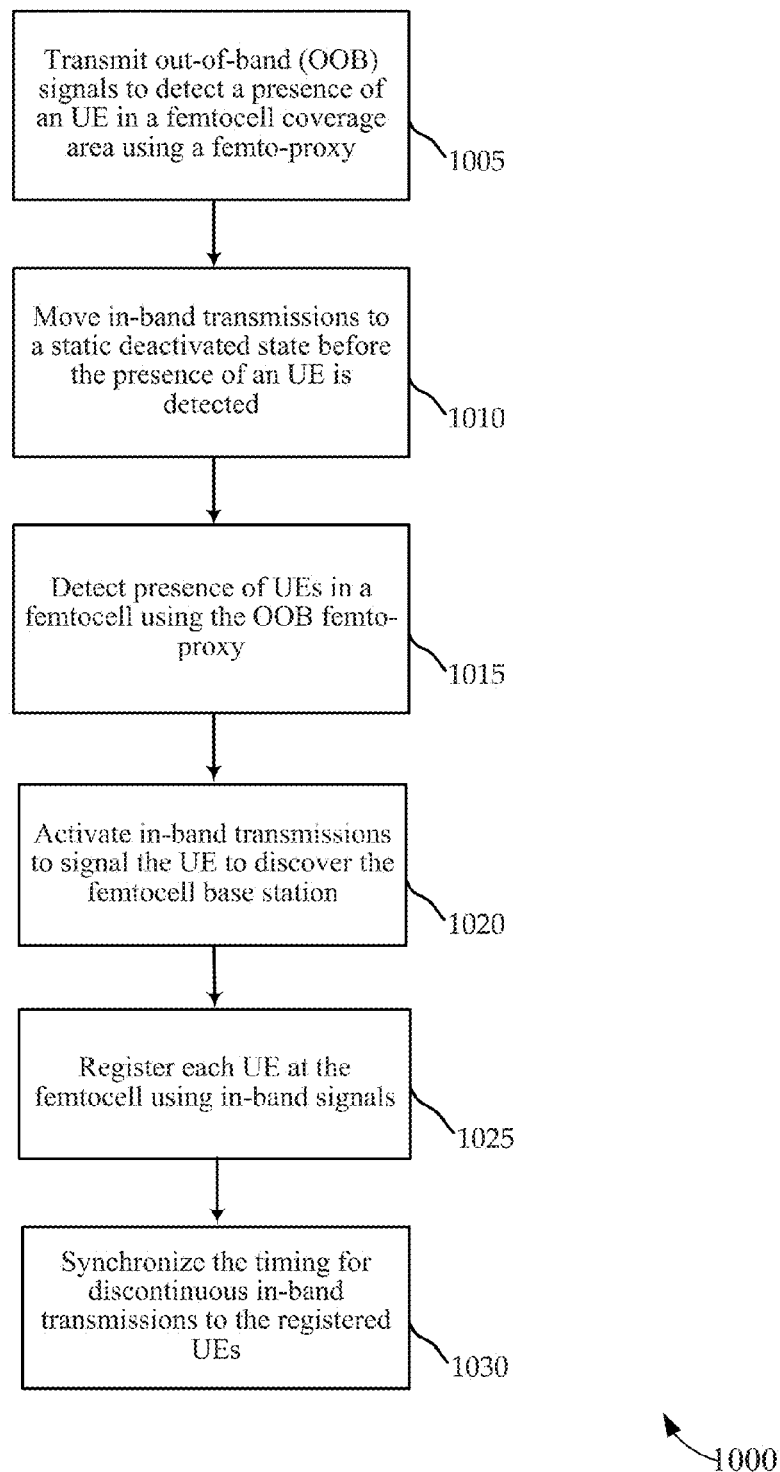
FIG. 10 is a flowchart of a method to synchronize the timing for discontinuous in-band transmissions in a femtocell.

FIG. 10 is a flowchart of a method 1000 to synchronize the timing for discontinuous in-band transmissions in a femtocell. The method 1000 may be performed, for example, in whole or in part, by the femto-proxy system 290 of FIG. 2A or 2B, or by the processor 300 of FIG. 3. The method 1000 may, more specifically, be performed by the FAP 230 and femto-proxy module 240 of FIG. 2A, 2B, or 3.

At stage 1005, OOB signals are transmitted to detect the presence of a UE in a femtocell using a femto-proxy. At stage 1010, in-band transmissions are moved to a static deactivated state before the presence of a UE is detected. At stage 1015, the presence of UEs in a femtocell is detected using the OOB femto-proxy. At stage 920, in-band transmissions are activated to signal the UEs to discover the femtocell base station. At stage 1025, each UE is registered at the femtocell using in-band signals. At stage 1030, the timing for discontinuous in-band transmissions to the registered UEs is synchronized.

Considerations Regarding the Description

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication in a femtocell, the method comprising:
   detecting a presence of user equipment (UE) in the femtocell coverage area using an out-of-band (OOB) femto-proxy;
   registering the UE at the femtocell responsive to the detected presence; and
   performing discontinuous in-band transmissions to the registered UE, the discontinuous in-band transmissions comprising a series of wake-up and powered-down states.

2. The method of claim 1, further comprising:
   performing discontinuous in-band transmissions comprising control information before detecting the presence of the UE.

3. The method of claim 2, further comprising:
   registering a second UE, the second UE requesting registration responsive to the discontinuous in-band transmissions comprising control information.

4. The method of claim 2, further comprising:
   disabling the discontinuous in-band transmissions comprising control information responsive to the detection of the UE; and
   performing in-band transmissions to signal the UE to discover the femtocell base station.

5. The method of claim 2, further comprising:
   changing a discontinuous cycle time of the discontinuous in-band transmissions comprising control information to a different cycle time for the discontinuous in-band transmissions to the registered UE.

6. The method of claim 1, further comprising:
   transitioning, before the detecting the presence of the UE, the in-band transmissions to a static deactivated state while the OOB signals are being transmitted to detect the UE.

7. The method of claim 1, further comprising:
   modifying a discontinuous transmission cycle in response to the proximity detection by the OOB femto-proxy.

8. The method of claim 1, wherein the discontinuous in-band transmissions to the registered UE comprise scheduling wake-up periods for transmission to the UE.

9. The method of claim 1, further comprising:
   synchronizing wake-up periods at the femtocell for transmissions to the UE and a plurality of other registered terminals.

10. The method of claim 1, further comprising:
    setting a discontinuous cycle time and wake-up period timing for downstream transmissions to UEs in idle mode in the femtocell.

11. The method of claim 1, further comprising:
    setting a discontinuous cycle time and wake-up period timing for downstream transmissions to UEs in connected mode in the femtocell.

12. The method of claim 11, further comprising:
    setting, after the discontinuous cycle time and wake-up period timing is set for the UEs in connected mode, a discontinuous cycle time and wake-up period timing for UEs in idle mode in the femtocell, the discontinuous cycle time and wake-up period timing for the UEs in idle mode set to cause wake-up periods in idle mode to overlap a subset of the wake-up periods in connected mode.

13. The method of claim 1, further comprising:
    determining discontinuous reception timing for the UE and a plurality of other registered UEs; and
    matching the wake-up states to the determined reception timing.

14. The method of claim 1, wherein,
    the method is performed by a plurality of networked devices;
    the in-band frequencies are useable for communication with a macrocell in addition to communication with the femtocell; and
    the OOB signals are Bluetooth signals.

15. The method of claim 1, wherein,
    the method is performed by a plurality of networked devices; and
    the in-band frequencies are useable for communication with a macrocell in addition to communication with the femtocell.

16. The method of claim 1, wherein,
    the method is performed by a plurality of networked devices; and
    the OOB signals are Bluetooth signals.

17. An apparatus for wireless communications in a femtocell, the apparatus comprising:
    one or more antennas;
    a transceiver coupled with the one or more antennas, and configured to transmit and receive in band and out-of-band (OOB) signals;
    a femto-proxy module, communicatively coupled with the transceiver, and configured to detect a presence of user equipment (UE) in the femtocell using OOB signals; and
    a femtocell access point, communicatively coupled with the femto-proxy module and the transceiver, and configured to:

register the UE at the femtocell responsive to the detected presence; and generate discontinuous in-band transmissions directed to the registered UE comprising a series of wake-up and powered-down states.

18. The apparatus of claim 17, wherein the femtocell access point is further configured to:
generate discontinuous in-band transmissions comprising control information before detecting the presence of the UE.

19. The apparatus of claim 18, wherein the femtocell access point is further configured to
disable the discontinuous in-band transmissions comprising control information upon detection of the UE; and
generate continuous in-band transmissions upon detection of the UE to signal the UE to discover the femtocell.

20. The apparatus of claim 18, further comprising a discontinuous transmission control module communicatively coupled with the femtocell access point, and configured to:
change a discontinuous cycle time of the discontinuous in-band transmissions comprising control information to a different cycle time for the discontinuous in-band transmissions to the registered UE.

21. The apparatus of claim 20, wherein the discontinuous transmission control module is configured to change the discontinuous cycle time when the UE is transitioned to idle mode.

22. The apparatus of claim 20, wherein the discontinuous transmission control module is configured to change the discontinuous cycle time when the UE is transitioned to connected mode.

23. The apparatus of claim 18, further comprising a discontinuous transmission control module communicatively coupled with the femtocell access point, and configured to:
trigger, before the detection of the presence of the UE, the femtocell access point to enter a static deactivated state while the OOB signals are being transmitted to detect the UE.

24. The apparatus of claim 17, further comprising a discontinuous transmission control module communicatively coupled with the femtocell access point, and configured to:
modify a discontinuous transmission cycle in response to the proximity detection by the femto-proxy module.

25. The apparatus of claim 17, wherein the femtocell access point is configured to:
transmit access parameters to the UE during a wake-up state.

26. The apparatus of claim 17, wherein the discontinuous in-band transmissions to the registered UE comprise scheduling wake-up periods for transmission to the UE.

27. The apparatus of claim 17, further comprising a discontinuous transmission control module communicatively coupled with the femtocell access point, and configured to:
synchronize a wake-up periods for the femtocell access point for transmissions to the UE and a plurality of other registered terminals.

28. The apparatus of claim 17, further comprising a discontinuous transmission control module communicatively coupled with the femtocell access point, and configured to:
determine discontinuous reception timing for the UE and a plurality of other registered UE; and
match the wake-up states to the determined reception timing.

29. The apparatus of claim 17, wherein,
the apparatus comprises a home node B using a femto-proxy system; and
the registration is performed using in-band transmissions.

30. An apparatus for wireless communications in a femtocell, the apparatus comprising:
means for detecting a presence of user equipment (UE) in the femtocell coverage area using out-of-band (OOB) signals;
means for registering the UE at the femtocell responsive to the detected presence; and
means for performing discontinuous in-band transmissions to the registered UE comprising a series of wake-up and powered-down states.

31. The apparatus of claim 30, further comprising:
means for changing a discontinuous cycle time responsive to the detection.

32. The apparatus of claim 30, further comprising:
means for changing a discontinuous cycle time of the discontinuous in-band transmissions comprising control information to a different cycle time for the discontinuous in-band transmissions to the registered UE in idle mode.

33. The apparatus of claim 30, further comprising:
means for deactivating discontinuous in-band transmissions while the OOB signals are being transmitted to detect the UE.

34. The apparatus of claim 30, further comprising:
means for modifying a discontinuous transmission cycle in response to the proximity detection by the OOB femto-proxy.

35. The apparatus of claim 30, further comprising:
means for synchronizing a wake-up cycle at the femtocell for transmissions to the UE and a plurality of other registered terminals.

36. The apparatus of claim 30, wherein,
the apparatus is a femto-proxy system;
the in-band frequencies are useable for communication with a microcell in addition to communication with the femtocell; and
the OOB signals are Bluetooth signals.

37. A processor for wireless communication in a femtocell, the processor configured to:
detect a presence of user equipment (UE) in a femtocell coverage area using out-of-band (OOB) signals;
register the UE at the femtocell responsive to the detected presence; and
perform discontinuous in-band transmissions to the registered UE comprising a series of wake-up and powered-down states.

38. The processor of claim 37, further configured to:
change, responsive to the detection, a discontinuous cycle time of the discontinuous in-band transmissions comprising control information to a different cycle time for the discontinuous in-band transmissions to the registered UE.

39. The processor of claim 37, further configured to:
change a discontinuous cycle time of the discontinuous in-band transmissions in an idle mode to a different cycle time for the discontinuous in-band transmissions in a connected mode.

40. The processor of claim 37, further configured to:
synchronize a wake-up cycle at the femtocell for transmissions to the UE and a plurality of other registered terminals; and
signal the UE and the plurality of other registered terminals for discontinuous receptions at the synchronized cycle time.

41. A computer program product residing on a non-transitory processor-readable medium and comprising processor-readable instructions configured to cause a processor to:

detect a presence of user equipment (UE) in a femtocell coverage area using an out-of-band (OOB) femto-proxy;

register the UE at the femtocell responsive to the detected presence; and perform discontinuous in-band transmissions to the registered UE comprising a series of wake-up and powered-down states.

42. A method of wireless communication in a femtocell, the method comprising:

setting a discontinuous cycle time and wake-up period timing for downstream transmissions to user equipment (UEs) in connected mode in the femtocell; and setting, after the discontinuous cycle time and wake-up period timing is set for the UEs in connected mode, a discontinuous cycle time and wake-up period timing for UEs in idle mode in the femtocell, the discontinuous cycle time and wake-up period timing for the UEs in idle mode set to cause wake-up periods for the UEs in idle mode to overlap a subset of the wake-up periods for the UEs in connected mode.

43. The method of claim 42, wherein the discontinuous cycle time for the UEs in connected mode is shorter than the UEs in idle mode.

44. The method of claim 42, wherein setting the wake-up period timing for the UEs in idle mode in the femtocell comprises:

aligning a start of a wake-up period for the UEs in idle mode with a start of the wake-up period for the UEs in connected mode.

45. The method of claim 42, wherein the wake-up period duration for the UEs in idle mode is equal to the wake-up period for the UEs in connected mode.

46. The method of claim 42, wherein the discontinuous cycle time for the UEs in idle mode is equal to an integer multiple of the discontinuous cycle time for the UEs in connected mode.

* * * * *